United States Patent
Kuan et al.

(10) Patent No.: US 8,018,671 B2
(45) Date of Patent: Sep. 13, 2011

(54) MAPPING DEFECTS ON A DATA WEDGE BASIS

(75) Inventors: Stephen KowChiew Kuan, Singapore (SG); AikChuan Lim, Singapore (SG); Edmun ChianSong Seng, Singapore (SG); UttHeng Kan, Singapore (SG); Det Hua Wu, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 1139 days.

(21) Appl. No.: 11/755,948

(22) Filed: May 31, 2007

(65) Prior Publication Data
US 2008/0298196 A1  Dec. 4, 2008

(51) Int. Cl.
*G11B 20/10*  (2006.01)
(52) U.S. Cl. ....................................................... 360/39
(58) Field of Classification Search ............ 360/60, 360/31, 53, 72.1, 39; 711/156, 170; 714/52
See application file for complete search history.

(56) References Cited

U.S. PATENT DOCUMENTS

| | | | |
|---|---|---|---|
| 6,188,242 B1 * | 2/2001 | Mahajan et al. | 326/41 |
| 6,223,303 B1 | 4/2001 | Billings et al. | |
| 6,496,943 B1 | 12/2002 | Belser et al. | |
| 7,055,013 B2 | 5/2006 | de Br bisson | |
| 7,072,129 B1 | 7/2006 | Cullen et al. | |
| 7,188,226 B2 | 3/2007 | de Brebisson et al. | |
| 2001/0055172 A1 | 12/2001 | Yip et al. | |
| 2005/0138464 A1 | 6/2005 | Chong et al. | |

OTHER PUBLICATIONS

U.S. Appl. No. 11/405,886, filed Apr. 18, 2006 entitled "Defect Reallocation for Data Tracks Having Large Sector Size".

* cited by examiner

*Primary Examiner* — Fred Tzeng
(74) *Attorney, Agent, or Firm* — Kirk A. Cesari

(57) ABSTRACT

A method to map defects is provided. A select data track of a storage medium is scanned for a defect. At least one data wedge affected by the defect on the select data track is identified. Each data wedge includes available area for writing user data defined between two servo wedges that include position information. The at least one affected data wedge is identified as unusuable.

16 Claims, 4 Drawing Sheets

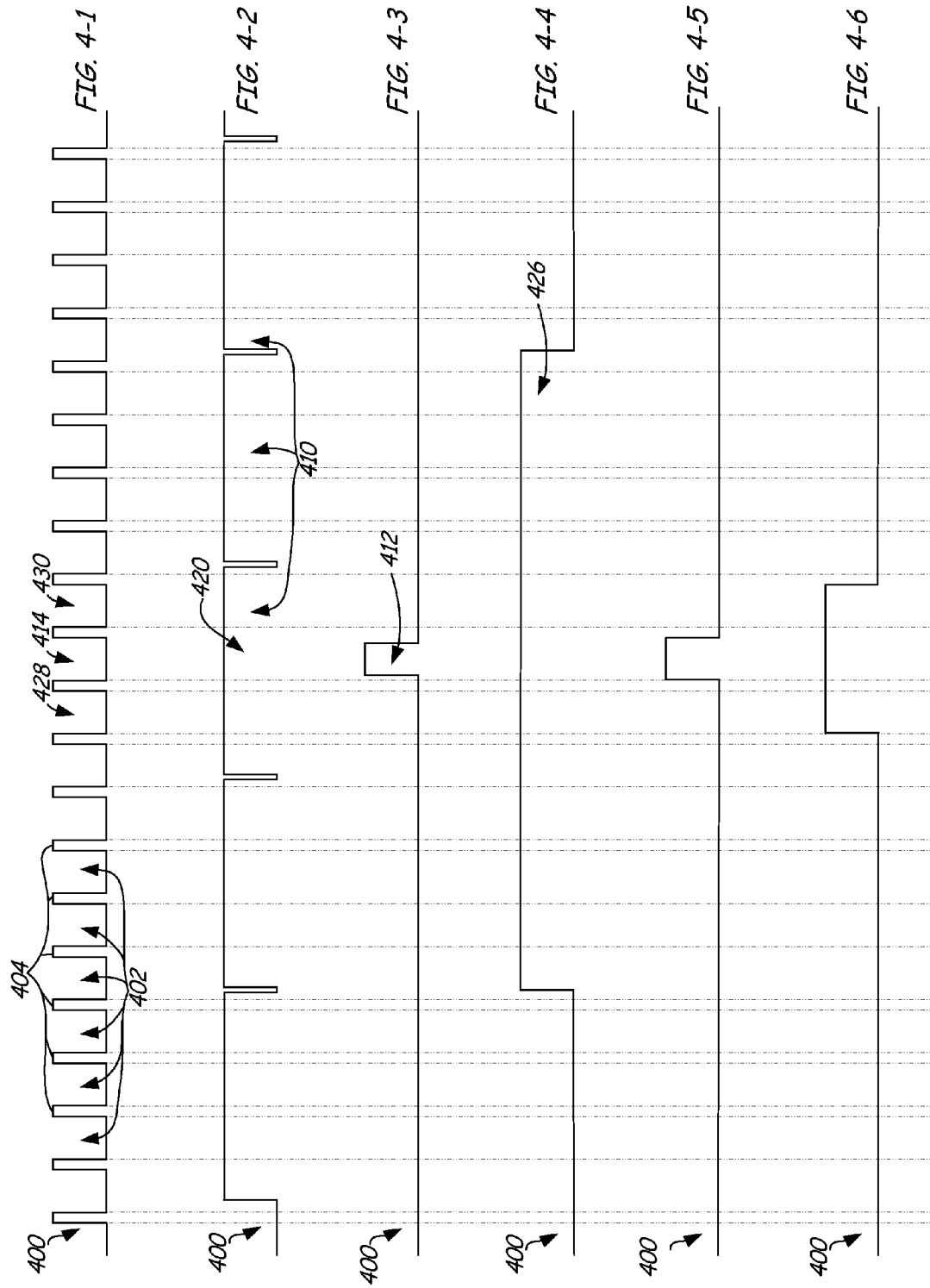

MAPPING DEFECTS ON A DATA WEDGE BASIS

BACKGROUND

The present disclosure relates generally to storage capacity in a data storage system, and more specifically, but not by limitation, to decreasing storage capacity loss due to defects of a storage medium in a data storage system.

The ever increasing popularity of electronic mobile devices has correspondingly included an increased demand for small sized high capacity data storage systems. Some types of data storage systems utilize magnetic recording technology. Often, to increase storage capacity in these types of systems includes an attempt at increasing areal densities, which can be accomplished through improvement in data heads including transducers and media components. In spite of the success in increasing areal densities, other ways to improve storage capacity are needed. For example, various improvements in format efficiency of the medium have been addressed to increase storage capacity, such as reducing preamble length of a data sector and reducing error correction code (ECC) symbols.

It has been determined that by increasing data sector size from the normal 512 bytes to more than 4096 bytes has dramatically reduced the FCC symbols needed without sacrificing correction capability. In addition, a reduction in FCC symbols also improves format efficiency. While increasing data sector size has shown these positive results, increasing data sector size has also shown some problems. One such problem is mapping defects on the increased data sector size using conventional mapping techniques. In particular, data sector-based defect mapping can eliminate format efficiency gain obtained from increasing data sector size.

SUMMARY

Unusuable area on a storage medium is determined based on the location of identified defects. The defects are determined relative to a data wedge, such that only affected data wedges and data wedges adjacent the affected data wedge are identified as unusuable area on the storage medium.

A method to map defects is provided. A select data track of a storage medium is scanned for a defect. At least one data wedge affected by the defect on the select data track is identified. Each data wedge includes available area for writing user data defined between two servo wedges that include position information. The at least one affected data wedge is identified as unusuable.

A system that maps defects is provided. A storage medium includes data tracks that are configured to store data in data wedges that occupy data sectors. Processing circuitry scans a select data track of the medium for a defect. The processing circuitry identifies at least one data wedge affected by the defect on the select data track. The at least one data wedge includes available area for writing user data that is located between two servo wedges that include position information. The processing circuitry also identifies the at least one affected data wedge as unusuable.

BRIEF DESCRIPTION OF THE DRAWINGS

FIGS. 4-1 through 4-6 illustrate different data tracks that can be used in the storage medium of FIGS. 1-3.

FIG. 5 is a flowchart illustrating a method of mapping a defect on a storage medium in a data track having large sized data sectors.

DETAILED DESCRIPTION OF ILLUSTRATIVE EMBODIMENTS

Figure 1:
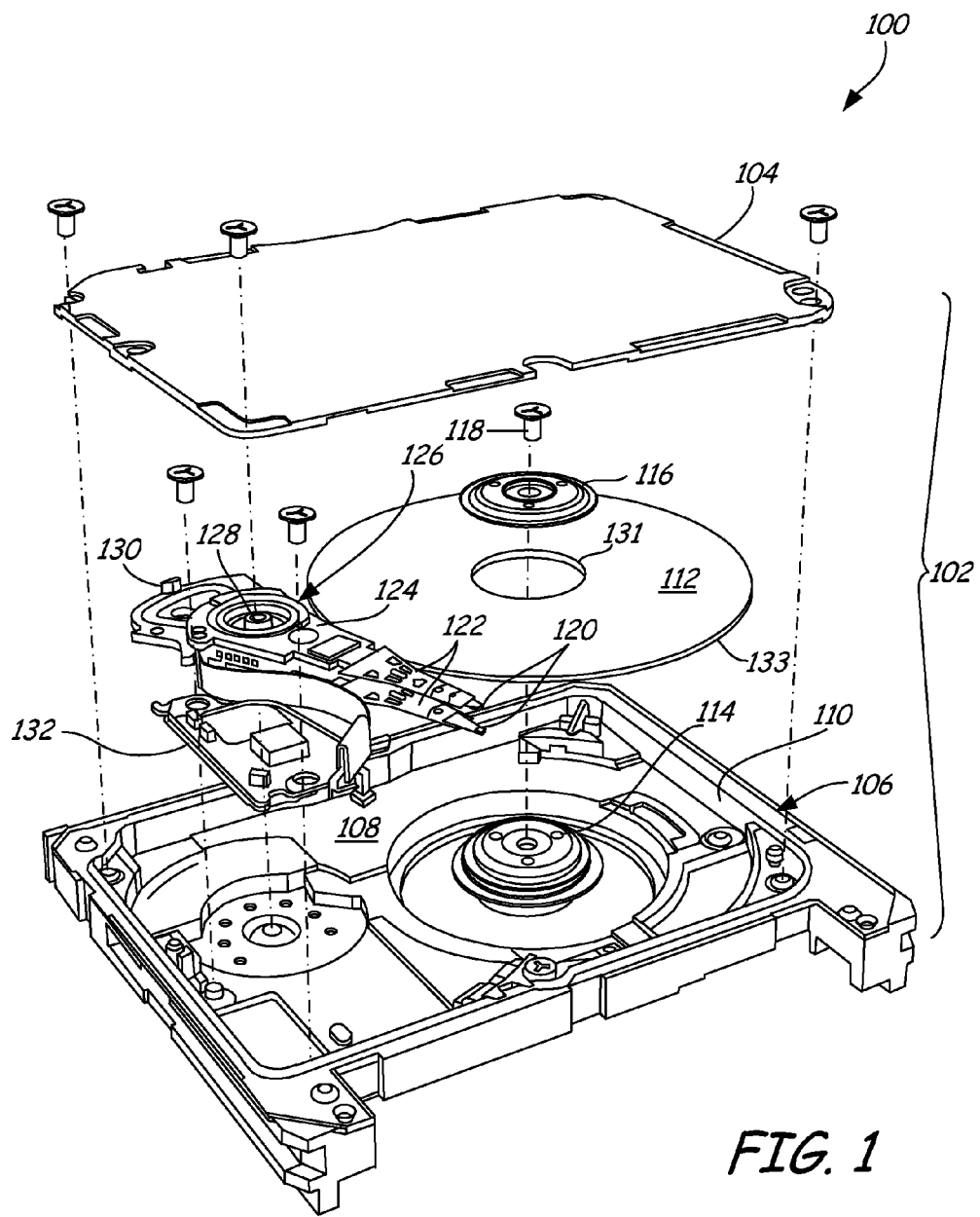
FIG. 1 is a perspective view of a disc drive.

FIG. 1 is an exploded perspective view of a disc drive 100 in which embodiments of the present invention are useful. Disc drives are common data storage systems. One or more embodiments of the present invention are also useful in other types of systems. Disc drive 100 is a small sized disc drive that can be used in connection with various types of electronic mobile devices, such as cell phones, personal digital assistants, cameras, video recorders and digital media players.

Disc drive 100 includes a housing 102 having a cover 104 and a base 106. As shown, cover 104 attaches to base 106 to form an enclosure 108 that is enclosed by a perimeter wall 110 of base 106. The components of disc drive 100 are assembled to base 106 and are enclosed in enclosure 108 of housing 102. As shown, disc drive 100 includes a medium 112 which is a disc 113. Although FIG. 1 illustrates medium 112 as a single disc, those skilled in the art should understand that more than one disc can be used in disc drive 100. Medium 112 stores information in a plurality of circular, concentric data tracks and is mounted on a spindle motor assembly 114 by a disc clamp 116 and pin 118. Spindle motor assembly 114 rotates medium 112 causing its data surfaces to pass under respective hydrodynamic bearing slider surfaces. Each surface of medium 112 has an associated slider 120, which carries transducers that communicate with the surface of the medium.

In the example shown in FIG. 1, sliders 120 are supported by suspension assemblies 122, which are, in turn, attached to track accessing arms 124 of an actuator mechanism 126. Actuator mechanism 126 is rotated about a shaft 128 by a voice coil motor 130, which is controlled by servo control circuitry within internal circuit 132. Voice coil motor (VCM) 130 rotates actuator mechanism 126 to position sliders 120 relative to desired data tracks, between a disc inner diameter 131 and a disc outer diameter 133.

Figure 2:
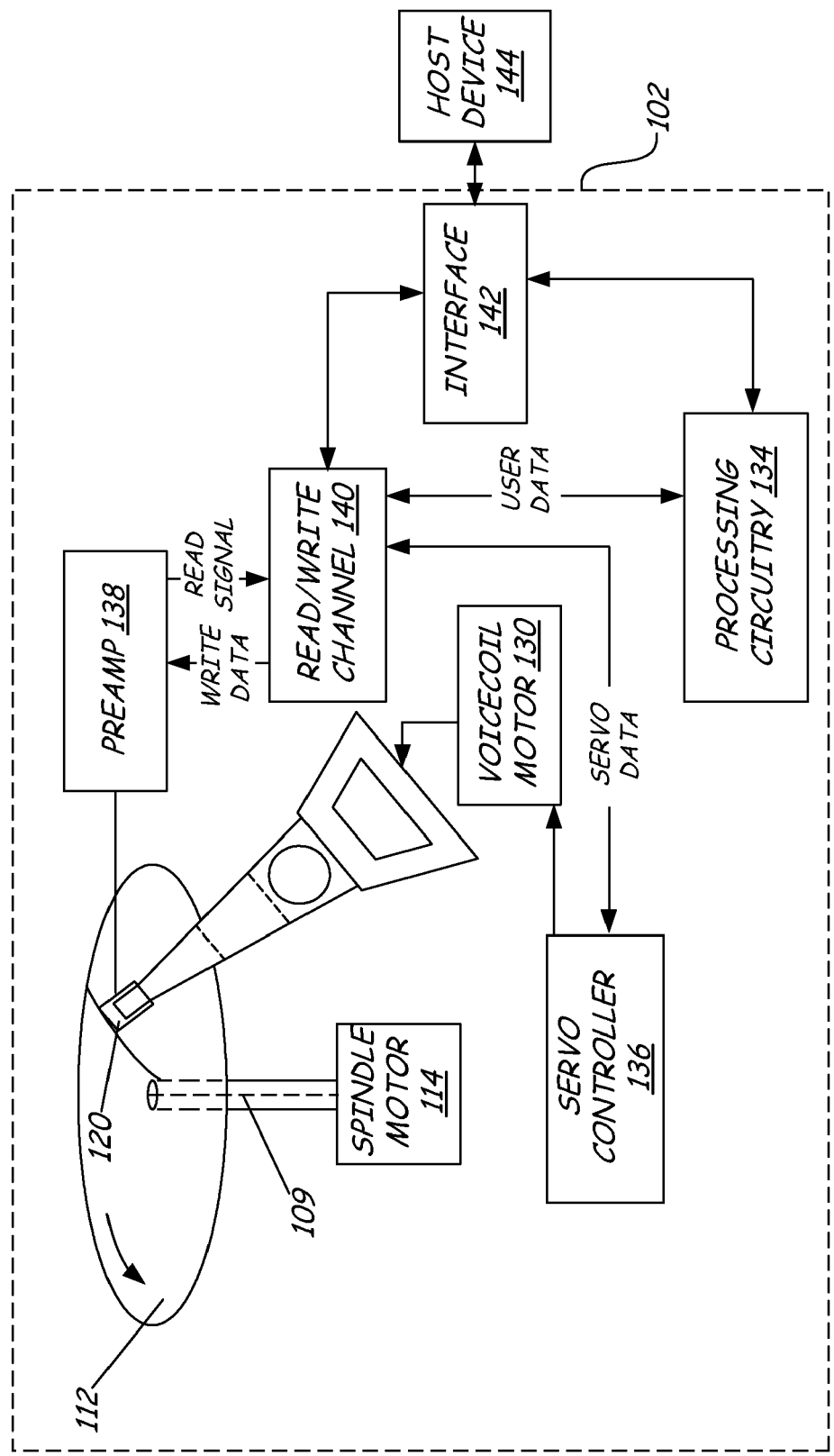
FIG. 2 is a simplified block diagram the disc drive illustrated in FIG. 1.

FIG. 2 is a simplified block diagram of disc drive 100 illustrated in FIG. 1 having housing 102. Disc drive 100 includes processing circuitry 134, which is used for controlling certain operations of disc drive 100 in a known manner. In accordance with the present invention, processing circuitry 134 is also used for carrying out data recovery of flawed data and the reallocation or movement of flawed data. The various operations of disc drive 100 are controlled by processing circuitry 134 with the use of programming stored in a memory. Disc drive 100 also includes servo controller 136 which generates control signals applied to VCM 130 and spindle motor 114. Processing circuitry 134 instructs servo controller 136 to seek sliders 120 to desired tracks. Servo controller 136 is also responsive to servo data, such as servo burst information recorded on medium 112 or disc 113 in embedded servo fields or wedges included in the data tracks.

Disc drive 100 further includes a preamplifier (preamp) 138 for generating a write signal applied to sliders 120 during a write operation, and for amplifying a read signal emanating from slider 120 during a read operation. A read/write channel 140 receives data from processing circuitry 134 during a write operation, and provides encoded write data to preamplifier 138. During a read operation, read/write channel 140 processes a read signal generated by preamp 138 in order to detect and decode data recorded on medium 112. The decoded data is provided to processing circuitry 134 and ultimately through interface 142 to host device 144.

Figure 3:
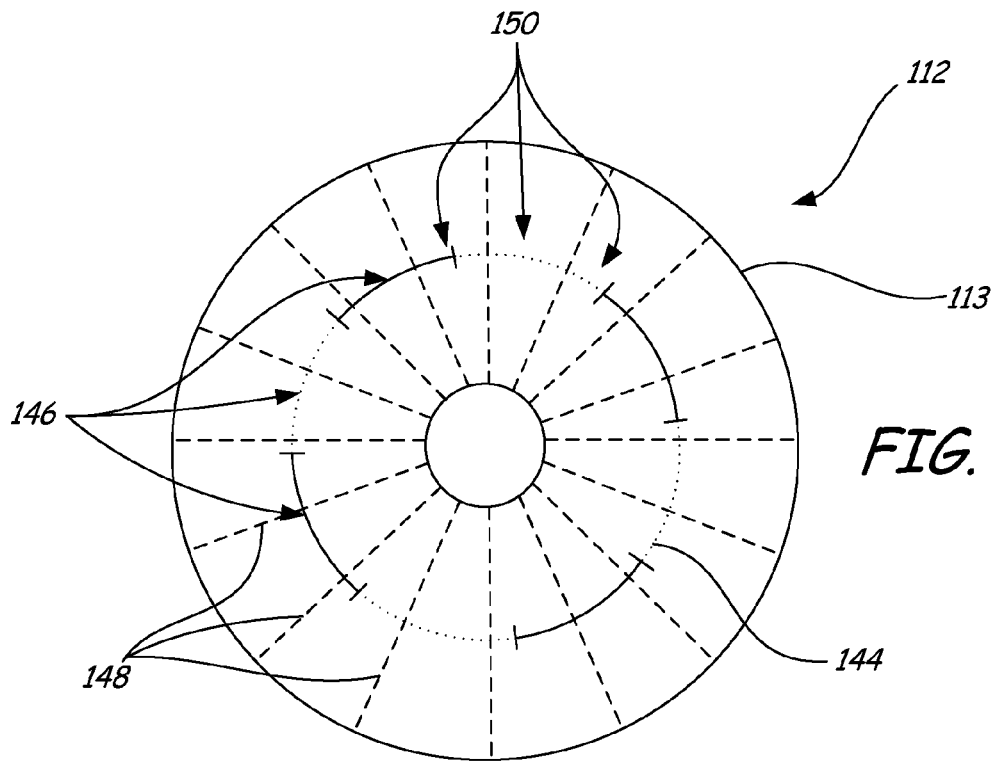
FIG. 3 illustrates a schematic diagram of the storage medium illustrated in FIGS. 1 and 2.

FIG. 3 illustrates a diagrammatical top plan view of disc or medium 112 illustrated in FIGS. 1 and 2. Medium 112 has a plurality of substantially concentric circular tracks of which data track 144 is illustrated in FIG. 3. Each track including data track 144 is subdivided into a plurality of data sectors 146 (illustrated as either solid segments or dotted segments of track 144). Data sectors 146 are the basic unit of data storage in medium 112 and include angular sections of a track that are bounded on two sides by radii of the disc and on the other side by the perimeter of the circle that defines the track. Each data sector 146 is identified and located at various positions on medium 112. In FIG. 3, data sectors located at various positions on medium 112 have a large size. For example, the data sector size can be as large as 4,096 bytes per data sector 146. A large sized data sector compared to a convention sized data sector of 512 bytes reduces the ECC symbols needed without sacrificing correction capability. In addition, a reduction in ECC symbols also improves format efficiency of medium 112. An increase in format efficiency allows medium 112 to have a large storage capacity.

Each track 144 also contains a plurality of servo wedges 148 and a plurality of data wedges 150. Each servo wedge 148 includes positioning information that is pre-written onto medium 112 such that the sliders 120 (FIGS. 1 and 2) on suspension 122 (FIG. 1) can easily locate data. In between each servo wedge 148 is a data wedge 150. Data wedges 150 include available area for writing user data. Data track 144 traverses data wedges 150. Since each data sector 146 has a large size (i.e. as much as 4,096 bytes per data sector), the data sectors 146 are unable to fit into a single data wedge 150 (i.e. the data sector is larger than a size of a data wedge). As illustrated in FIG. 3, each data sector 146 likely spans across or contain at least portions of N data wedges 150 (where N is a whole number greater than 1) and more than one servo wedge 148. This is called a split data sector. As illustrated in FIG. 3, each data sector 146 can also contain portions of a data wedge 150.

FIGS. 4-1 through 4-6 schematically illustrate a data track 400. In FIG. 4-1, data track 400 illustrates a plurality of data wedges 402 interspersed between a plurality of servo wedges 404. Each data wedge 402 is defined by two servo wedges 404. Each data wedge 402 includes available area for writing user data and each servo wedge 404 includes position information. Although FIG. 4-1 illustrates one example of the frequency of data wedges 402 and servo wedges 404, it should be realized that the frequency of data wedges and servo wedges can be smaller or larger than the frequency of data wedges 402 and servo wedges 404 illustrated in FIG. 4-1. In FIG. 4-2, data track 400 illustrates a plurality of data sectors 410. Each data sector 410 is an example size of a 4,096 byte data sector. A 4,096 byte data sector is a large sized data sector that can reduce the amount of ECC symbols needed in a data sector without sacrificing correction capability. While reduction in ECC symbols improves format efficiency on a storage medium that increases storage capacity, mapping defects on large sized data sectors using conventional mapping techniques eliminates any format efficiency gain obtained from increasing the data sector size. It should be realized that data track 400 can have data sector sizes that are larger or smaller than a 4,096 byte data sector. For example, data track 400 can have a data sector size of 512 bytes or a data sector size of 1,024 bytes.

FIG. 4-4 illustrates the results of using conventional mapping techniques due to a defect illustrated in FIG. 4-3 on data track 400 when data track 400 includes a data sector size of 4,096 bytes. FIG. 4-3 illustrates the relative size of a defect 412 on data track 400. Defect 412 is small enough to affect a single servo wedge 414 of servo wedges 402 illustrated in FIG. 4-1 and a portion of a single data sector 420 having 4,096 byte data sector size illustrated in FIG. 4-4.

In the conventional process of mapping defects in a storage medium during a factory certification process of the storage medium, a data sector that is affected by a defect is identified as unusuable. In addition, an adjacent data sector on one side of the affected data sector and an adjacent data sector on the other side of the data sector are also identified as unusuable. As illustrated in FIG. 4-4, an unusable area 426 on track 400 is identified in accordance with the defect 412 identified on track 400 in FIG. 4-3. Unusable area 426 includes the affected 4,096 byte data sector 420 as well as an adjacent data sector on one side of the affected data sector 420 and an adjacent data sector on the other side of the affected data sector 420. As is illustrated, the conventional process of mapping relatively small defects in a storage medium having a large sector size detrimentally affects storage capacity. In comparison, the same size defect would identify smaller amounts of space as unusuable on smaller sized data sectors, such as a 512 byte data sector track or a 1,024 byte data sector track.

Figure 5:
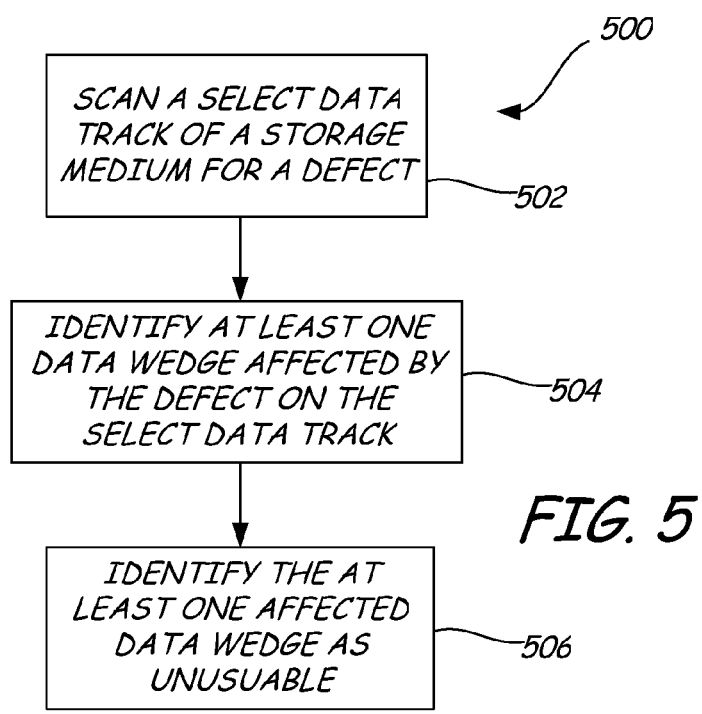

FIG. 5 is a flowchart 500 illustrating one embodiment of a method of mapping a defect on a storage medium in a data track having large sized data sectors, such as data sectors including 4,096 bytes. At block 502, a select data track, such as data track 400 of FIG. 4, of a storage medium, such as storage medium 112 of FIGS. 1-3 is scanned for a defect, such as defect 412 of FIG. 4-3. The data track is configured to store data in data wedges, such as data wedges 402 of FIG. 4-1 that occupy data sectors. Each data wedge is defined by a servo wedge, such as servo wedge 404, on one side and a servo wedge on the other side. The process of scanning as illustrated in block 502 can be accomplished during a factory certification process, a field certification process or a scan for grown defects.

At block 504, at least one data wedge is identified as being affected by the defect on the select data track. In another embodiment, a plurality of data wedges can be identified as being affected by the defect on the select data track. Oftentimes, the identified defect is a result of a scratch or grown defect on the storage medium. At block 506, the at least one affected data wedge is identified as unusuable. In the embodiment where a plurality of data wedges are identified as being affected by the defect, then the plurality of data wedges are identified as unusuable. To identify data wedges as unusuable, affected data wedges can be dynamically mapped and identified through a logical-to-physical mapping table and/or object based storage.

In one embodiment, identifying the affected data wedge(s) includes padding the affected data wedge(s) with arbitrary data. In yet another embodiment, a first adjacent data wedge, such as first adjacent data wedge 428, and a second adjacent data wedge, such as second adjacent wedge 430, adjacent to the servo wedges, such as servo wedges 404, that define the affected data wedge(s), such as data wedge 414, are also identified as unusuable. In one embodiment, identifying the first adjacent wedge and the second adjacent wedge includes padding the first adjacent wedge and the second adjacent wedge with arbitrary data.

FIG. 4-5 illustrates data track 400 having 4,096 byte data sectors mapped in accordance with the process illustrated in FIG. 5. In one embodiment, upon identification of defect 412 (FIG. 4-3), data wedge 414 (FIG. 4-1) is identified as unusuable. Therefore, data wedge 414 of data track 400 is padded with arbitrary data as illustrated in FIG. 4-5. In another embodiment, upon identification of defect 412 (FIG. 4-3), data wedge 414 is identified along with first adjacent data wedge 428 (FIG. 4-1) and second adjacent data wedge 430 (FIG. 4-1) as unusuable. Therefore, data wedge 414, data wedge 428 and data wedge 430 are padded with arbitrary data as illustrated in FIG. 4-6. It should be understood that data wedge that are adjacent to data wedge 414 are not just limited to data wedges 428 and 430. In addition, data wedges that are adjacent data wedge 414 can be on a different data track that are adjacent to data track 400.

Instead of mapping defects on a sector by sector basis, which is done in the conventional process, defects are mapped on a wedge by wedge basis such that minimal space is deemed unusuable compared to the large amount of space deemed unusuable as illustrated in FIG. 4-4. It should also be noted that mapping defects on a wedge by wedge basis can also be beneficial in smaller sized data sector data tracks. For example, having a high frequency of servo wedges and data wedges on a data track relative to each data sector can result in less space being identified as unusuable even in comparatively smaller sized data sectors than a 4,096 byte data sector data track.

During normal data storage system operation, processing circuitry, such as processing circuitry 134 of FIG. 2, will instruct a transducer to write information to a data track while skipping over any data wedge sin the data track that have been padded (i.e., denoted as unusuable). A write process that skips over padded data wedges instead of padded data sectors will not experience any significant change in data throughput.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matter of structure and arrangement of parts within the principles of the disclosure to the full extent indicated by the broad general meaning of the terms in which the appended claims are expressed. For example, the particular elements may vary depending on the particular application for a rotatable data storage device while maintaining substantially the same functionality without departing from the scope of the disclosure. In addition, although the embodiments described herein are directed to a storage medium having large data sector size, it will be appreciated by those skilled in the art that the embodiment of the disclosure can be applied other types of storage media that have similar issues, without departing from the scope of the disclosure.

What is claimed is:

1. A method comprising:
    scanning a select data track of a storage medium for a defect, wherein the select data track includes at least one data sector that is spaced across at least portions of N number of data wedges and at least one servo wedge, wherein N is a whole number greater than 1;
    identifying at least one data wedge affected by the defect on the select data track, wherein each data wedge includes available area for writing user data and is defined between two servo wedges that include position information; and
    identifying the at least one affected data wedge as unusable by padding the at least one affected data wedge with arbitrary data.

2. The method of claim 1, further comprising identifying as unusuable data wedges that are adjacent to the at least one affected data wedge.

3. The method of claim 2, further comprising padding the at least one affected data wedge and the data wedges adjacent the at least one affected data wedge with arbitrary data.

4. The method of claim 2, wherein the data wedges that are adjacent to the at least one affected data wedge include data wedges that are on a different data track than the select data track and data wedges on the select data track that are adjacent the servo wedges that define the at least one affected data wedge.

5. The method of claim 1, wherein identifying the at least one data wedge affected by the defect on the select data track comprises identifying a plurality of data wedges affected by the defect on the select data track, wherein each affected data wedge is identified as unusuable and data wedges that are adjacent each affected data wedge are identified as unusuable.

6. The method of claim 1, wherein scanning the select data track of the medium for the defect comprises scanning the select data track of the medium for a scratch.

7. A system comprising:
    processing circuitry configured to:
        scan a select data track of a medium for a defect;
        identify at least one data wedge affected by the defect on the select data track, wherein the at least one data wedge includes available area for writing user data that is located between two servo wedges that include position information; and
        identify the at least one affected data wedge as unusable by padding the at least one affected data wedge with arbitrary data.

8. The system of claim 7, wherein the processing circuitry is further configured to identify as unusuable data wedges that are adjacent to the at least one affected data wedge.

9. The system of claim 8, wherein the processing circuitry is configured to pad the at least one affected data wedge and the data wedges adjacent the at least one affected data wedge with arbitrary data.

10. The system of claim 8, wherein the data wedges that are adjacent to the at least one affected data wedge include data wedges that are on a different data track than the select data track and data wedges on the select data track that are adjacent the servo wedges that define the at least one affected data wedge.

11. The system of claim 7, wherein processing circuitry is configured to identify a plurality of data wedges affected by the defect on the select data track, wherein each affected data wedge is identified as unusuable and a first adjacent servo wedge and a second adjacent servo wedge that define the plurality of affected data wedges are identified as unusuable.

12. The system of claim 7, wherein the processing circuitry is configured to scan the select data track of the medium for a scratch.

13. A storage medium comprising:
    a data track;
    a plurality of data wedges, each of the data wedges located between servo wedges, wherein the data track traverses the plurality of data wedges;
    at least one data sector on the data track, the data sector traversing at least portions of N data wedges, where N is a whole number greater than 1; and
    at least one defect on the data track, the at least one data wedge on the data track corresponding to the defect is identified as unusuable by padding the at least one unusuable data wedge with arbitrary data.

14. The storage medium of claim 13, further comprising at least one adjacent data wedge that is adjacent to the at least one unusuable data wedge, wherein the at least one adjacent data wedge is padded with arbitrary data.

15. The storage medium of claim 14, wherein the at least one adjacent data wedge is on a different data track than the at least one data track that the defect is located.

16. The storage medium of claim 14, wherein the at least one adjacent data wedge is adjacent the servo wedges that define the at least one unusuable data wedge.

* * * * *